United States Patent [19]

Barcaroli et al.

[11] 4,356,547
[45] Oct. 26, 1982

[54] DEVICE FOR PROCESSING TELEPHONE SIGNALS, INCLUDING A PROCESSOR AND A PREPROCESSOR SHARING A COMMON MEMORY

[75] Inventors: Valerio Barcaroli; Carlo DeMichelis; Giuseppe Giandonato; Silvano Giorcelli, all of Turin, Italy

[73] Assignee: CSELT—Centro Studi e Laboratori Telecomunicazioni S.p.A., Turin, Italy

[21] Appl. No.: 107,659

[22] Filed: Dec. 27, 1979

Related U.S. Application Data

[63] Continuation-in-part of Ser. No. 891,194, Mar. 29, 1978, abandoned.

[30] Foreign Application Priority Data

Mar. 31, 1977 [IT] Italy .............................. 67702 A/77

[51] Int. Cl.³ ............................................. G06F 15/16
[52] U.S. Cl. .................................................. 364/200
[58] Field of Search ........................ 364/200 MS File

[56] References Cited

U.S. PATENT DOCUMENTS 3,886,330  5/1975  Egelston et al. ................. 364/200 X
4,015,242  3/1977  Anceau et al. ....................... 364/200

OTHER PUBLICATIONS

Storey, T. F., "Design of a Microprogram Control for a Processor in an Electronic Switching System", *The Bell Systems Technical Journal*, Feb. 1976.
Thierer, M., "Prioritätssteuerung im vechnergesteuerten Vermittlungs-System IBM 3750", *Nachrichten-technische Zeitung*, 29 (1976) H.2. pp. 117-119.

Primary Examiner—Raulfe B. Zache
Attorney, Agent, or Firm—Karl F. Ross

[57] ABSTRACT

An apparatus for handling incoming signals from sensors monitoring the state of certain points of a telephone circuit as well as outgoing signals for drivers associated with other circuit points includes a preprocessor PE inserted between the assembly DR of sensors and drivers, on the one hand, and a processor EL, on the other hand. The preprocessor and the processor have access, through a bus 5, to a common memory ME having areas allocated to the scanning of the circuit points, to time-counting operations and to the storage of messages from the preprocessor. A microprogram memory in the preprocessor, when addressed by a sequencer CM started automatically, manually or in response to an instruction from the processor, initiates a temporary seizure of the bus—if the latter is available—whereupon an initial address is delivered from the common memory ME to a working memory ML in the preprocessor to start the scanning of successive pairs of circuit points. If the pair being scanned is connected to sensors, a change of state in either point is reported to the processor if verified by an integration procedure under the control of a read-only memory MIN in the preprocessor; if the points are connected to drivers, the same read-only memory MIN controls the emission of outgoing signals to them. Upon the completion of the scanning operation, the preprocessor performs lower-priority tasks of generating clock messages and measuring signal durations before relinquishing control of the bus.

5 Claims, 4 Drawing Figures

DEVICE FOR PROCESSING TELEPHONE SIGNALS, INCLUDING A PROCESSOR AND A PREPROCESSOR SHARING A COMMON MEMORY

CROSS-REFERENCE TO A RELATED APPLICATION

The present application is a continuation-in-part of our copending U.S. patent application Ser. No. 891,194 filed Mar. 29, 1978 and now abandoned.

FIELD OF THE INVENTION

Our present invention relates to data-processing apparatus to be used in the handling of phenomena which may be considered of binary type, i.e. in systems where the circuit points concerned may have two different states, as in telephone signaling.

BACKGROUND OF THE INVENTION

It is known that in such systems it may be necessary to check the state of the relevant circuit points in order to detect state transitions, durations of a given state, etc.; moreover, it may be necessary that information relative to changes in the state of any point, filtered to discriminate possible short spurious transitions due to disturbances, be available within a very short time from the transition itself so as to allow the processor to control operations which may require the sending of information to those points.

Situations of this kind are usual in telecommunication systems utilizing a mode of signalization by means of a sequence of pulses (such as intermittent presence or absence of direct currents on certain wires), e.g. in processor-controlled switching operations of a telephone exchange, in the automatic determination of charges, or in the recording of traffic information. This encompasses, generally, all the cases in which instantaneous recognition is necessary for real-time processing of the information carried by such signals.

The storage of information for the purposes referred to requires a series of repeated checks of the individual points affected by the procedure, these checks taking place possibly at different recurrence rates and with different filtering for different groups of points according to their characteristics (kind of signalization, maximum speed of signal variation, sensitivity to spurious signals).

The processor which controls the data-handling procedure cannot be always directly entrusted with these repeated operations, both because it would find it difficult to carry them out at the necessary speed and because the performance of these recurrent and rather elementary operations would detract from the processing capacity required for handling the data.

Thus, the necessity arises to interpose, between the processor and the point whose state is to be surveyed, means for supplying the processor with real-time information on the state of these points so as to free the processor from all recurrent tasks. Moreover, as the exactitude of the information supplied by these means determines the correctness of the decisions carried out by the processor, their operation must be easy to check, possibly by the processor itself; furthermore, such means must be easily adaptable to variations in the working conditions (number and arrangement of the points, the rate at which they are scanned, their features and so on).

To solve these problems, two general solutions are known in the art.

According to the first solution, a cabled logic network is interposed between the processor and the totality of the circuit points involved in the procedure; this logic network is equipped with a data memory (generally of the cyclic type) as well as with a buffer memory facing the processor. The network serves for the detection of the state of the points and, conversely, for the generation of signals to be fed to these points.

An arrangement of this kind allows the processor to be free from all the less sophisticated operations and enables a better utilization of its capacity of handling the actual control task; yet it entails some disadvantages. Thus, if a large number of points are to be monitored, a system of this kind presents a considerable circuit complexity.

Moreover, such a system is not very flexible, i.e. it cannot easily be adapted to working conditions different from those it has been designed for; more particularly, it cannot accommodate either a different number and arrangement of the monitored points or a variation in the rate of their exploration. Finally, as it is equipped with a memory of its own which is not accessible to the processor, it is not easily controlled by the latter.

According to the second conventional solution, a device interposed between the processor and the monitored point is used only for transferring logical signals either toward the processor or toward these points, thus leaving to the processor the tasks of exploring, interpreting and treating the received data as well as the generation of the outgoing control signals.

Such a system, in contrast to the one referred to above, is very flexible as the interposed device can be completely controlled by the processor program, which simplifies the control and evaluation operations; moreover, this device has a very simple structure as it acts only as an electronic interface.

However, owing to its very simplicity, such a system does not solve the problem of allowing the processor to be free from purely repetitive tasks; consequently, it can generally be utilized only when the number of circuit points to be monitored is very limited.

OBJECTS OF THE INVENTION

The object of our present invention, therefore, is to provide an apparatus for more effectively handling incoming and outgoing signals exchanged between sensors and drivers of a telecommunication system on the one hand and a processor on the other.

SUMMARY OF THE INVENTION

In accordance with our present invention we provide a preprocessor with input connections from the sensors and output connections to the drivers of associated circuit points, a common memory connected to the processor and to the preprocessor, and a bus interlinking the processor, the preprocessor and their common memory. A microprogrammer in the preprocessor, responsive to an instruction from the processor communicated by way of that bus, carries out a sequence of operations involving a seizure of the bus by the preprocessor for the duration of such sequence, a scanning of the consecutive circuit points on the basis of address information supplied by the common memory, reception of incoming signals and emission of outgoing signals relating to point being scanned, and an evaluation of the incoming signals with the aid of logical circuitry exchanging data with the common memory through the bus, the logical circuitry including a read-only memory which is jointly addressable by a current-state signal from a given circuit point and a previous-state signal from the common memory for supplying integration codes determining the recognition or non-recognition of a definite change of state to be communicated to the processor.

Pursuant to a more particular feature of our invention, the logic circuitry of the preprocessor further includes a working memory for storing an initial address received from the common memory at the beginning of the processing sequence and arithmetic means controlled by the microprogrammer for modifying that initial address on the basis of signals identifying the scanned circuit points.

According to further features of our invention, the read-only memory has cells containing sample codes for the generation of outgoing signals, the cells being jointly addressable by a predetermined incoming signal from driver-controlled circuit points and data bits stored in areas of the common memory respectively allocated to such circuit points.

According to yet another feature of our invention, the preprocessor further comprises input and output registers for the temporary storage of incoming and outgoing signals, respectively, other registers for the temporary storage of data arriving from and leaving for the common memory via the bus, and a further register inserted between the arithmetic means and the bus for reading out modified addresses throughout the seizure of the bus by the preprocessor.

Pursuant to still another feature of our invention, the microprogrammer includes a microprogram memory stepped by a sequencer and a logic network inserted between the microprogram memory and the sequencer for commanding the performance of lower-priority tasks after the scanning of the circuit points and prior to the release of the bus by the microprocessor.

BRIEF DESCRIPTION OF THE DRAWING

The above and other features of our invention will now be described in detail with reference to the accompanying drawing in which.

SPECIFIC DESCRIPTION

Figure 1:
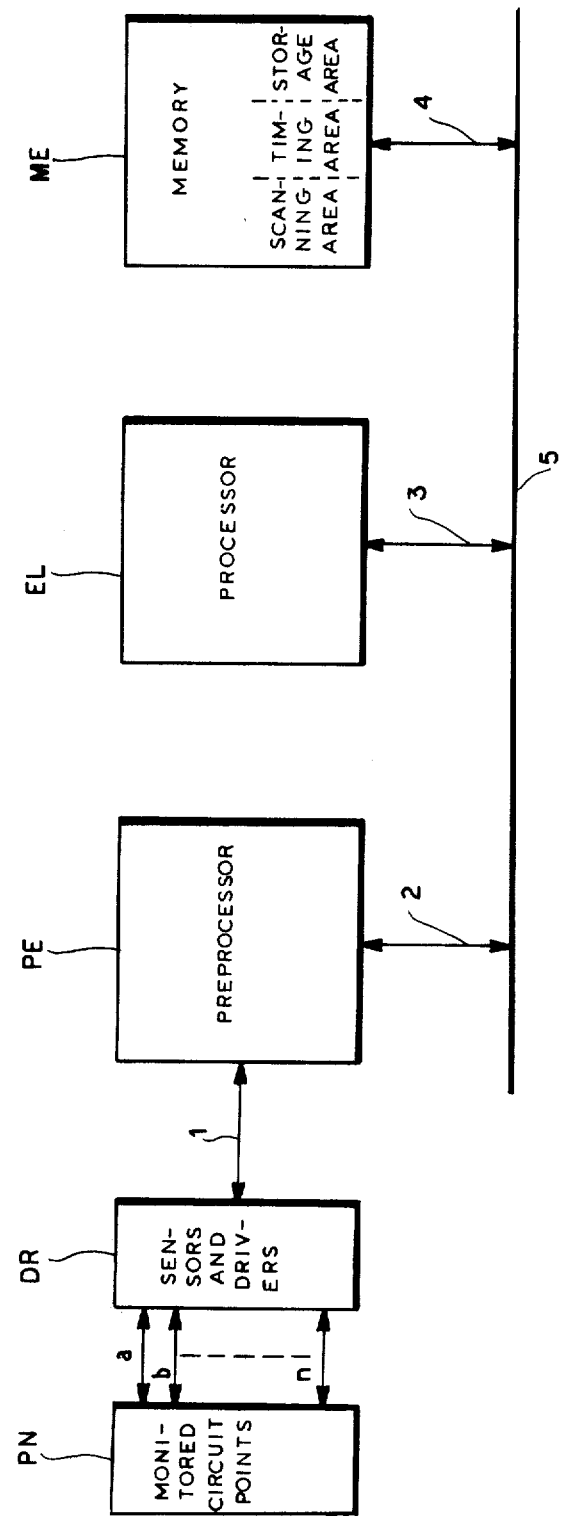
FIG. 1 shows a processor-controlled system embodying our present invention.

In FIG. 1 a block PN represents a set of circuit points of a telephone network on which binary signals as defined above are present. Such points are involved in a data-handling procedure which is controlled by a conventional processor EL and entails on the one hand the detection of electrical parameters present on a number of points PN and on the other hand the emission of analogous parameters. Such detection and emission may occur with variable perodicity from one set of points to another.

Reference DR denotes an assembly by sensors and drivers designed on the one hand to detect the state of points PN and on the other hand to distribute to them the appropriate signals coming from a preprocessing unit PE. Two-way connections between assembly DR and points PN are schematically represented by leads a,b, . . . n.

Assembly DR converts information obtained from points PN into incoming logical signals and carries out the opposite operations for outgoing signals intended for points PN.

Through a connection 1, assembly DR supplies preprocessor PE with samples of these logical signals, transmits timing signals to the preprocessor, and may also supply further information for identifying the points to which the samples relate; in the opposite direction, assembly DR receives the samples to be supplied to drivers and possibly information relating to the identification of points from which that assembly must extract signals or to which signals are to be fed.

In case assembly DR supplies this identifying information to processor PE, the operation of the latter is synchronous; in case preprocessor PE supplies information identifying the point to be scanned or driven, the operation of the preprocessor is asynchronous.

Devices carrying out the described operations are well known in the art; see also commonly owned application Ser. No. 886,526 filed by Michele Castriotta et al on Mar. 14, 1978, now U.S. Pat. No. 4,220,824.

Preprocessor PE, whose structure will be described in further detail with reference to FIG. 2, has the following tasks:

(a) To effectuate a digital integration of the samples supplied by assembly DR through connection 1, in order to distinguish between true state changes of the explored points and spurious transitions due to transient disturbances, and to communicate to processor EL suitable messages indicating the recognition of these state changes. Such integration is carried out according to thresholds which may differ from one point to another and which are determined during a start-up phase, the information necessary for the integration being stored in suitable areas of a memory ME common to processing components PE and EL.

(b) To set sequentially on drivers in assembly DR the levels corresponding to the emission of a given telephone signal.

(c) To generate clock messages, designed for processor EL, at a rhythm predetermined during the start-up phase.

(d) To carry out time countings required by the processor EL, e.g. for measuring the duration of events, and to generate messages of elapsed time at the end of the counting operation; these counting operations are carried out for points or sets of points, possibly with different rhythms likewise established during the start-up phase, and take the form of a decrementation of values entered by computer EL in corresponding zones of the common memory ME.

Through a line 2 the preprocessor PE is connected to a multiple 5, referred to hereinafter as "bus", to which also processor EL and memory ME are connected.

Lines 3 and 4 schematically represent the linking of bus 5 with processor EL and memory ME, respectively.

Through this bus the preprocessor receives from processor EL start-up data and possible supervisory signals, e.g. orders for time measurements. In the opposite direction, preprocessor PE sends to processor EL the messages mentioned above; besides, it can supply to the processor possible "interrupt" commands when any malfunction is detected. The bus, furthermore, gives the preprocessor PE access to common memory ME.

Through the common bus 5, a dialogue between preprocessor PE, processor EL and common memory ME occurs according to the "cycle stealing" technique, which means that the bus is generally controlled by the processor and such control is transferred to the preprocessor for a limited time upon the latter's request. In this way we ensure, statistically, a minimum interference between the requests for cycles of memory ME made by components EL and PE.

Common memory ME represents the data and program store of processor EL. To allow preprocessor PE to carry out the aforementioned operations, the memory comprises three areas to which both processor EL and preprocessor PE may have access.

The first or scanning area is designed to store the information relative to operations pertaining to integration and sending of samples to assembly DR.

In this area every circuit point connected to any of the sensors will have available a certain number of bits to register the state detected in the last exploring operation carried out, the value of the associated integration threshold (i.e. the number of sampling operations or integration steps necessary to consider a transition as definite), and the number of integration steps actually carried out.

Points connected to drivers have available an equal number of bits to store the logic level which is to be sent to them, as well as codes characterizing such points as associated with drivers.

This scanning area can be considered subdivided into subareas each corresponding to a certain minimum set of points to which preprocessor PE may have access by indirect addressing.

The term "indirect addressing" means that the location of such subareas in memory ME is stored in a so-called "relocation table", whose location is in turn stored in preprocessor PE as a starting datum; whenever the information pertaining to a point is to be read or written in memory ME, the address of the subarea corresponding to the set containing such point is first read in that table, and then the cell with which the point is associated is addressed in such subarea. This procedure presents three main advantages:

(a) A better utilization of the free zones of the memory, as each subarea may be physically located in the most convenient memory position and can be easily displaced in case of variation in the contents of the memory, without causing any modification in the codes identifying individual points.

(b) Possibility of modular memory amplification, made necessary for instance by the growth of the telephone network. Thus, if each set of points corresponding to a subarea conforms to the basic modulus of the network, the addition of a set will correspond to the addition in memory ME of a subarea as well as to the addition of an address in the "relocation table".

(c) Independence of the point-identifying codes from their processing periodicity or scanning cadence. By grouping in each subarea the points that are to be scanned with the same cadence, subareas with different cadences may be distinguished in the relocation table by the number of times their initial address appears in the table itself.

Each subarea may be organized into "words" whose length may exceed the number of bits necessary to detect the state of one point; if such length is sufficient, each word may contain information relating to a plurality of points, provided these are scanned with the same periodicity. It is evident that in this way the capacity of the preprocessor may be increased.

The second or timing area of the memory, designed to permit time-counting operations, consists of a number of tables each comprising several cells wherein a code relating to time to be measured is set by processor EL, these cells being read by preprocessor PE with the periodicity required by the processor.

Each table may correspond to one of several possible counting rhythms whereas the number of cells of each table may depend upon the number and kind of points supervised by the system.

Finally, the third or storage area acts as a buffer memory for messages generated by preprocessor PE; it is written by the preprocessor and read by processor EL.

Before describing in detail the structure of preprocessor PE, we may consider its capacity.

First of all, it is evident that preprocessor capacity depends on its processing speed, which directly affects its rhythm of acceptance of the signals supplied by assembly DR, and thus on the maximum scanning rate of points PN.

Secondly, taking into account the most general case where only a part of the points of the grouping PN are to be explored or scanned with the same periodicity, it is clear that the preprocessor capacity will depend on the number of points to be scanned with different periodicity as well as on the required scanning rate; obviously, the lower the scanning rates and the ratio between the number of points to be scanned at high rate and the number of points to be explored at low rate, the greater the overall number of points which may be monitored by the preprocessor. In any event, these points will be distributed so that during a time equal to the highest-rate sampling period an equal number of points are always scanned. Such time period may be referred to as a "multiframe".

Another parameter affecting the processing capacity is given by the number of points whose information may be registered as part of the same code word, i.e. by the number of points which may be handled in parallel.

The preprocessor according to our invention particularly described hereinafter by way of example is designed, in conjunction with the overall system of which it forms part, to deal simultaneously with two points to be scanned with the same periodicity, the length of the code word stored in the memory being twice the number of bits necessary to detect the state of a point.

Obviously, processor EL is assumed to have a sufficient capacity to be able to handle the traffic furnished by the preprocessor.

Figure 2:
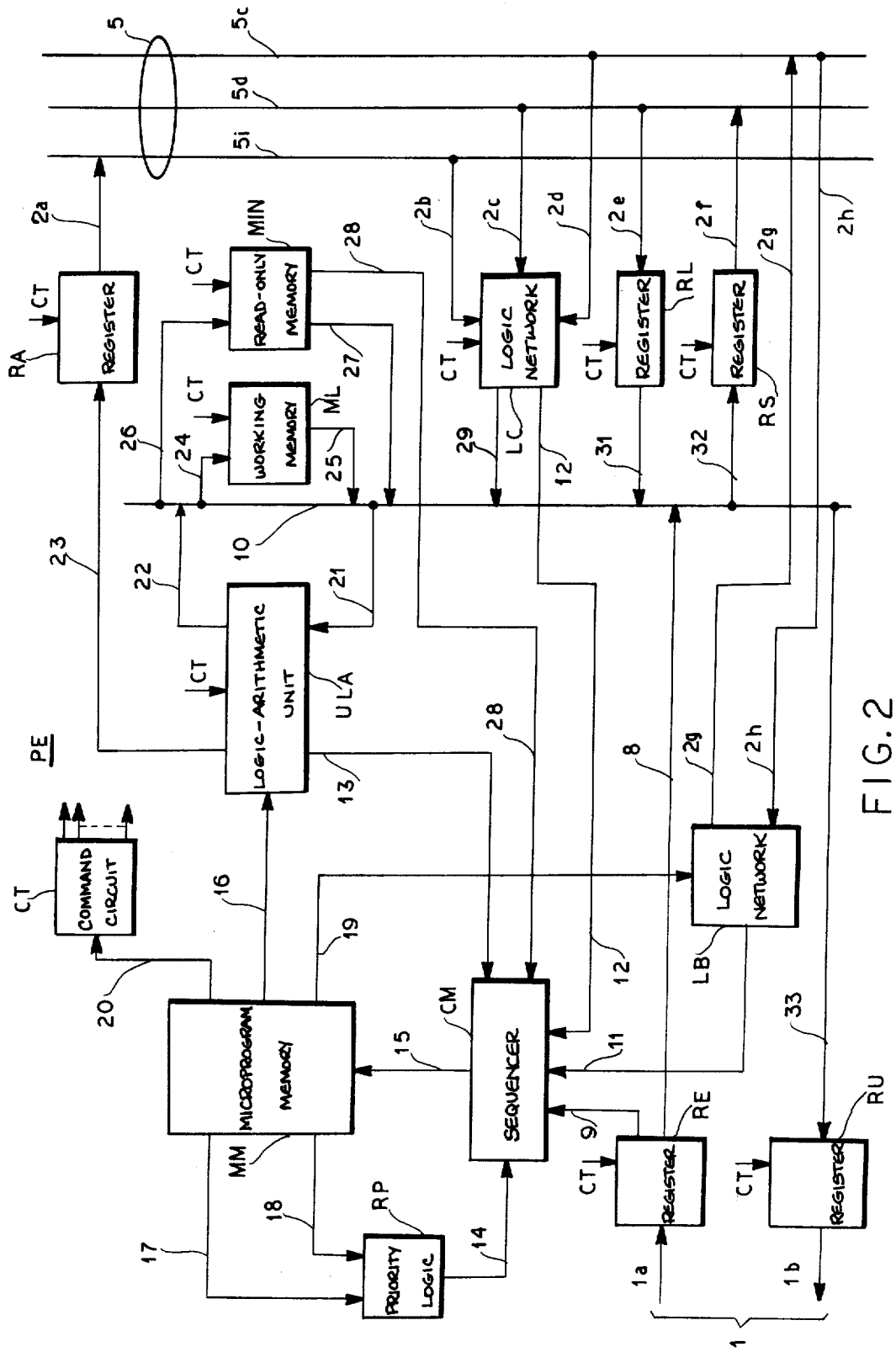
FIG. 2 is a block diagram of a preprocessor included in the system of FIG. 1.

In FIG. 2, references 5i, 5d, 5c denote common channels for addresses, data and commands, respectively, which jointly form the bus 5, whereas references 2a-2h denote the various groups of unidirectional wires which together form the bidirectional connection 2 of FIG. 1.

A register RE acts as an input device of the preprocessor on the side of monitoring assembly DR (FIG. 1).

Through a set of wires 1a included in connection 1, input register RE receives from assembly DR samples resulting from the scanning operation (here considered as relating to a pair of circuit points). Moreover, if the operation of the preprocessor is synchronous, register RE receives the code allowing the identification of the monitored pair (hereinafter referred to as "pair code") and for each pair a further signal (hereinafter referred to as "present-pair signal") which starts in component PE the processing cycle pertaining to this pair. On the other hand, if the operation of the preprocessor is asynchronous, register RE receives, besides the samples, only a cyclical signal corresponding to the period of a multiframe.

The samples as well as the possible pair code are transferred from register RE, through a connection 8, to an internal bus 10 of the preprocessor wherefrom they are routed to the various parts of the preprocessor on the basis of the microinstructions of the stored microprogram. The present-pair signal is sent through a connection 9 to a sequencer CM which is part of a microprogrammer also including a memory MM supplying microinstructions to a conventional logic-arithmetic unit ULA equipped with internal registers; the task of units CM, MM and ULA will be described in greater detail hereinafter. The preprocessor comprises also a priority logic RP designed to store the events which may take place during the processing time, each with its respective priority ranking. Upon microprogram request, unit RP may modify the address of the next instruction of the microprogram according to the stored events.

Unit CM receives:

from unit RP, through a connection 14, the information relating to the address of the next microinstruction and to a possible modification thereof based on the state of the other inputs of unit CM as described hereinafter;

from unit RE, through connection 9, the present-pair signal which starts a processing cycle;

through a connection 11, a signal indicating the availability of common bus 5 to write and read in common memory ME (FIG. 1), that signal coming from a logic network LB whose operation will be described hereinafter;

through a connection 12, the codes of the orders supplied by processor EL (FIG. 1) and emitted by a logic network LC whose operation will also be described hereinafter;

through a connection 28, the codes relating to digital integration of incoming samples arriving from assembly DR (FIG. 1) and to the emission of outgoing samples designed for that assembly;

through a connection 13, information relating to the result of the operations carried out by logic-arithmetic unit ULA.

During each processing cycle, on the basis of the address of the previous microinstruction, of information arriving from unit RP and of the state of connections 9, 11, 12, 13, 28, unit CM supplies to memory MM, through a connection 15, the address of the microinstruction to be executed.

Such microinstruction will comprise:

the code of possible operations to be carried out in logic-arithmetic unit ULA, such a code being supplied to unit ULA through a connection 16;

information relating to the address of the next microinstruction, supplied to unit RP through a connection 17;

the conditions to be memorized in unit RP with the assigned priority, and a possible modification instruction depending on such conditions, of the information present on connection 17, such conditions and instructions being supplied to unit RP through a connection 18;

any further request of access to common bus 5, conveyed by a connection 19 to logic network LB;

the orders for information transfer between the various units of the preprocessor, as well as orders for loading incoming information or for the transfer of outgoing information to the outside, the latter orders being conveyed through a connection 20 to a command circuit CT which has the task of enabling such transfers.

Logic-arithmetic unit ULA carries out elementary operations (logical calculations, masking, data transfer from one register to the next, data input or output, etc.) requested by a microinstruction. Through a connection 21, unit ULA receives from internal bus 10 data on which it has to operate, including data for starting up the system which consists of initial addresses and of lengths of the tables and common areas of the memory. The latter data are presented on bus 10, through a connection 25, by a suitable working memory ML to which they are supplied by processor EL (FIG. 1) through common bus 5, input logic LC, an output 29 of unit LC, internal bus 10 and a connection 24. Through a connection 22, unit ULA supplies processed data to internal bus 10; through a connection 23 it supplies to a register RA the addresses for read-write operations in common memory ME (FIG. 1).

Units RP, CM, MM, ULA and CT are well known in the art and need not be described in further detail.

Working memory ML is also entrusted with the task, in case of asynchronous operation of preprocessor PE, of generating pair codes; in that instance, memory ML comprises a cell acting as a counter with a modulus equal to the number of points which can be processed during a sampling period.

A read-only memory MIN carries out a digital integration of samples arriving from assembly DR (FIG. 1) as well as the emission of samples to that assembly. For this purpose, memory MIN contains certain codes corresponding to possible integration conditions for signals coming from sensors as well as codes corresponding to possible operations to be carried out in order to send the samples to the drivers.

A connection 26 allows the addressing of memory MIN according to rules which will be described hereinafter with reference to the mode of operation of the apparatus.

Memory MIN reads out on a connection 27 either state bits updated as a result of the integration, to be sent to common memory ME, or the samples to be transferred to assembly DR (FIG. 1); on connection 28 (FIG. 2) it delivers the codes relating to operations to be carried out on these bits.

The presence of a single memory which controls both integration and sample emission lets the preprocessor operate in the same manner on incoming and outgoing signals.

Logic network LC serves to convert message formats coming from processor EL to the internal formats of the preprocessor, to send such messages onto bus 10, and to inform unit CM of instructions arriving from the processor.

The inputs of network LC consist of connections 2b, 2c, 2d respectively connected to the three channels 5i, 5d, 5c of bus 5.

More particularly, logic network LC receives through connection 2b the addresses to be decoded for determining if any messages are intended for the preprocessor; through connection 2c it receives these messages and through connection 2d it receives the instructions for loading the same messages.

Network LC sends out on connection 12 the instructions intended for unit CM and on a connection 29 the data coming from channel 5d and intended for the various units of the preprocessor.

Two registers RL, RS, connected on the one side to data channel 5d of bus 5 through respective connections 2e and 2f and on the other side to internal bus 10 of the preprocessor PE through respective connections 31 and 32, represent the units through which direct dialogue between preprocessor PE and memory ME (FIG. 1) takes place. They have the respective tasks of temporarily storing data read in memory ME or to be written therein, as well as of adapting the format and the transmission rate of these data so that they satisfy the requirements of the preprocessor or of the memory ME, respectively. As noted above, the addresses for these reading and writing operations in the memory are supplied by unit ULA through connection 23 and the register RA which has to maintain such addresses present on its output 2a and on address channel 5i for the entire time required by preprocessor PE to seize the bus and to carry out read and write operations.

The access to the bus to carry out these operations is controlled by logic network LB, which receives from memory MM through connection 19 the instructions relating to bus requests as well as the information concerning the operations to be carried out in the memory (read or write) and transfers such requests and information to processor EL (FIG. 1) through a connection 2g and command channel 5c; in the opposite direction the network LB receives from processor EL, through command channel 5c and a connection 2h, information relating to the availability conditions of the bus which it communicates to unit CM through connection 11.

Finally, reference RU denotes a further register, which in case of synchronous operation of preprocessor PE collects samples that are to be sent to assembly DR (FIG. 1) and are intended for the pair of points identified by the code which in this cycle is present at the input of register RE; these samples are supplied to output register RU by integration memory MIN through connection 27, bus 10 and a connection 33, and are conveyed to assembly DR through a connection 1b forming part of line 1.

In case of asynchronous operation, register RU has also the task of emitting to assembly DR identification signals relating to the pair of points to be acted upon.

The distribution of signals from bus 10 to the various units of preprocessor PE is controlled, as already mentioned, by command circuit CT; to simplify the drawing, connections between that circuit and the units controlled thereby are schematically represented by arrows CT extending to those units.

Besides, for timing the various operating phases within a cycle, we provide a time base (not shown) which is asynchronous with respect to both the operations of processor EL and the operations of assembly DR; the necessary connection between the operations of preprocessor PE and those of assembly DR is established by either the present-pair signal or the signal marking the start of a multiframe.

The operation of the system shown in FIGS. 1 and 2 will now be described with reference to FIGS. 3 and 4.

First of all, upon start-up 101 (FIG. 3) of the system or whenever a change in operating conditions takes place, it is necessary to load into the preprocessor (step 103), and more particularly into memory ML, initial data which are supplied by processor EL.

To enable the loading, the preprocessor must be in a state 102 where it waits for orders coming from the processor after the memory ML has been completely cleared.

This waiting state 102 is generated by memory MM which, independently of any other conditions, is forced into the corresponding position by means of the sequencer CM. This circuit, in turn, is automatically started, upon the start-up of the system, or may be put into service either manually (e.g. by means of a pushbutton not shown in the drawing) or upon an instruction coming from the processor.

Under these conditions, processor EL begins the loading phase 103 by emitting on channel 5i an address which reaches the network LC through connection 2b. In network LC such address is decoded and recognized as pertaining to the preprocessor, enabling network LC to load, through connection 2c, data present on channel 5d; the actual loading will then be controlled by a command supplied to network LC via channel 5c and connection 2d. These data contain, besides the information to be memorized, also an indication of its destination in preprocessor PE, in this case the address of a cell of memory ML.

In the course of the execution of a decision stage 103' in preprocessor PE, this destination is communicated to sequencer CM through connection 12; circuit CM, in turn, addresses memory ML through connection 15, microprogram memory MM, connection 20 and circuit CT, enabling memory ML to receive data coming from network LC through bus 10 and connection 24.

Once the initialization or loading phase 103 is terminated, the processor transfers to sequencer CM (again through circuit LC) the operating instructions advancing the microprogram in memory MM.

As a consequence, preprocessor PE is placed in a state 104 of waiting for signals from outside.

During normal service, as already mentioned, the preprocessor must perform the following operations (listed in an order of decreasing priority):

(A) Synchronous or asynchronous operations ancillary to the scanning of the circuit points, i.e. either integration of incoming samples supplied by the sensors or emission of outgoing samples to drivers.

(B) Generation of clock messages fed to the processor.

(C) Time counting.

These types of operations will now be separately described.

(A) Sample Integration and Emission

Figure 3:
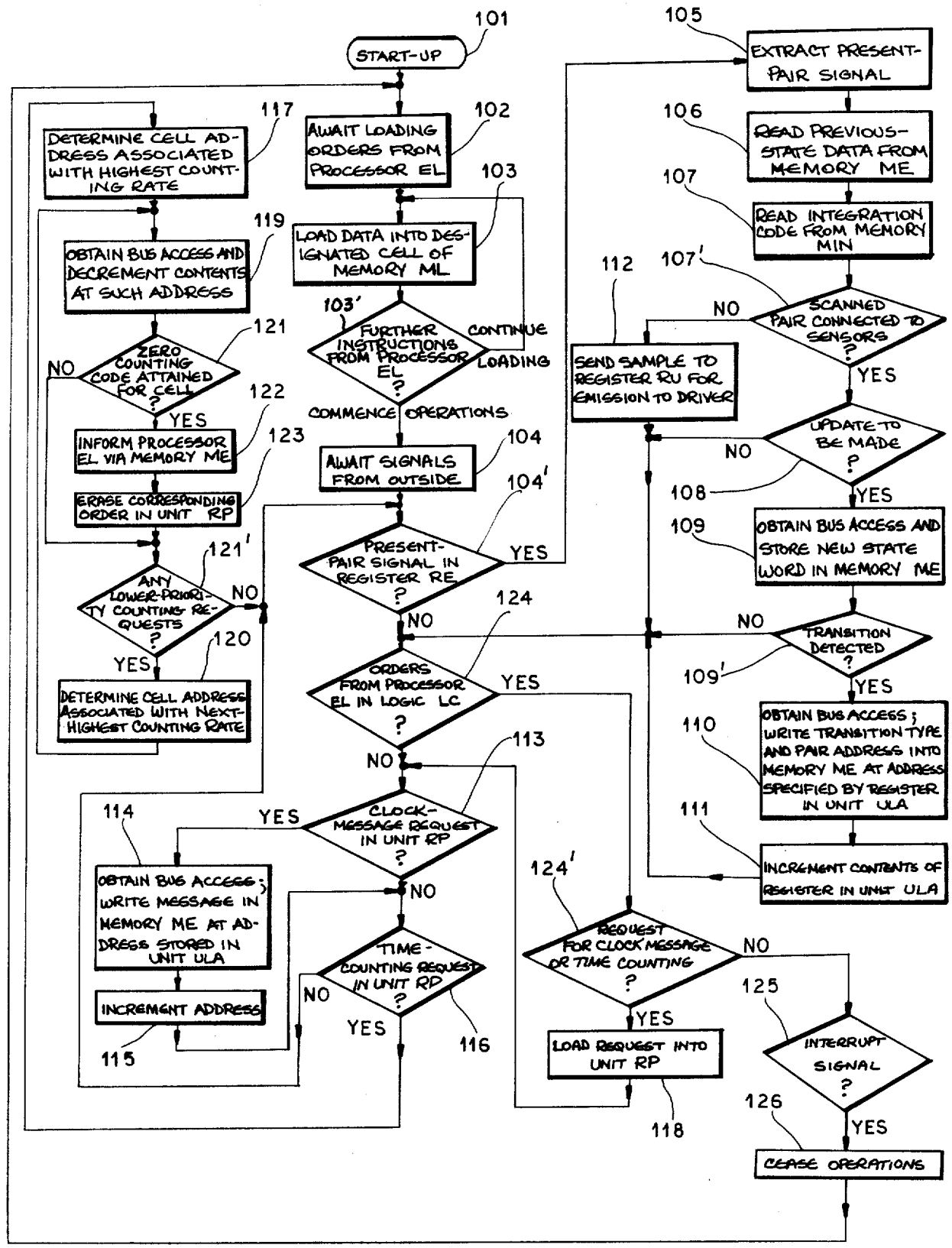
FIG. 3 is a flow-chart diagram showing steps in a synchronous operation of the preprocessor illustrated in FIGS. 1 and 2.
Figure 4:
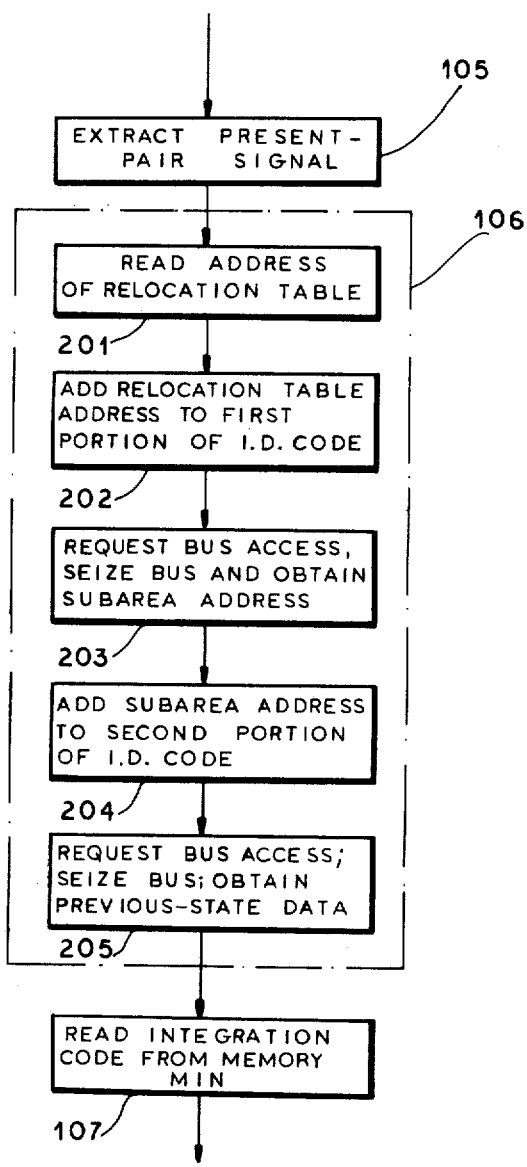
FIG. 4 is a flow-chart diagram showing in detail sequential operations included in a step of FIG. 3.

When the operation is synchronous, as assumed in the flow chart of FIG. 3, the results of the scanning of the circuit points carried out by assembly DR, in the form of samples of the signals extracted from sensors (or fictitious samples in the case of points connected to drivers), the identification codes and the present-pair signals are sent to the preprocessor through connection 1a.

In light of the foregoing assumptions regarding the distribution of circuit points and the allotment to such points of the cells by common memory ME, each pair code will generally comprise a first part, relating to the set the pair belongs to, and a second part, relating to the location of the pair in the set, regardless of whether the pair is connected to sensors or to drivers.

As soon as these signals are presented to preprocessor PE, they are loaded into input register PE; this loading operation is facilitated by the fact that the processing time in the preprocessor of signals pertaining to a pair of points is assumed to be less than the time interval between two consecutive signals. Under these circumstances, sequencer CM scans in a recurrent step 104' register RE and extracts (step 105) therefrom, through connection 9, the present-pair signal in order to start the processing cycle 106–112 relating to that pair.

The first operation 106 of such a cycle will be the reading in memory ME of the previous state of the pair. As already discussed, the access of the preprocessor to memory ME is obtained through indirect addressing. First of all, the initial address of the relocation table is read in memory ML; according to step 201 in a subcycle 201–205 indicated in FIG. 4, the order for reading in this memory is given by memory MM through connection 20 and circuit CT.

The address read in memory ML is then transferred to unit ULA through connection 25, internal bus 10 of preprocessor PE and connection 21; in unit ULA this initial address is additively combined (step 202) with the part of the pair code relating to the set which has been previously transferred from register RE to unit ULA through connection 8, bus 10 and connection 21.

In a subsequent operation 203, in order to obtain the address in common memory ME of the subarea corresponding to the set, memory MM requires the availability of common bus 5 to processor EL through connection 19, logic network LB and connection 2g.

When, through connection 2h, logic network LB and connection 11, a signal confirming the availability of bus 5 arrives at sequencer CM, the modified address previously elaborated in unit ULA is sent to register RA through connection 23 and from there to memory ME (FIG. 1) through connection 2a, channel 5a and connection 4. At the same time, through connection 19, logic network LB and connection 2b, the order of reading the data stored at the address present at that moment on channel 5i is sent to memory ME.

The read data, which form the initial address of the involved subarea in memory ME, are transferred to arithmetic-logic unit ULA through connection 4, data channel 5d, connection 2e, register RL, connection 31, internal bus 10 and connection 21. In unit ULA that address is additively combined (step 204) with the code relating to the position of the scanned pair in the set; this code was previously extracted from register RE, through the aforementioned path, in order to generate the address of the cell of the common memory ME actually allotted to the pair. By an identical procedure 205, a new reading in memory ME is carried out and the stored word pertaining to the previous state of the pair of points is loaded into register RL.

If such points are connected to sensors of assembly DR, as checked by preprocessor PE at a decision junction 107, the code word representing the state of each point will comprise a bit denoting the old level, two or more bits for integration counting, and one or more bits indicating the value of the integration threshold. These bits, along with the bit in register RE denoting the logical value of the present state of the point, are utilized as a reading address for the evaluation of incoming signals in integration memory MIN and are supplied to it through connections 31 (previous state of the points) and 8 (current state), internal bus 10 and connection 26.

With this evaluation of signals from points monitored by sensors, the completed addressing operation will implement the answering of an updating inquiry 108 by giving access to a cell of memory MIN wherein a code corresponding to one of the following three cases is stored:

(1) No operation required (negative reply to inquiry 108) since each of the two points has maintained its previous state and no integration is in progress. As soon as reading is started in memory MIN, this information is sent to sequencer CM through connection 28; on the other hand, no significant bits are present on connection 27.

(2) Updating 109 of memory ME required inasmuch as for one or both points an integration is in progress which is not yet completed, or else a state change has taken place which requires the integration to start. This information, too, is sent through connection 28 to sequencer CM which commands its memorization in unit RP. Moreover, the new state word to be stored in memory ME is present on connection 27.

(3) Updating 109 of memory ME and generation 110, upon an affirmative response to a transition query 109', of a message of definitive transition signifying that for one or both points an integration previously in progress has been completed; in this case, too, the new state to be written will be present on connection 27 whereas connection 28 carries the information of recognized transition which will cause sequencer CM to command the emission of a suitable message to the processor.

In the first case, preprocessor PE will remain available for operations of lower priority such as clock messages or time countings.

In the second and third cases, requiring the updating 109 of the state of the scanned pair in the memory ME, that memory again receives the previously elaborated address and the new datum to be written, available on connection 27, is conveyed to register RS through internal bus 10 and connections 32 whence it is fed to the memory through connection 2f, data channel 5d and connection 4. A writing command for entry of this datum in memory ME will be sent by memory MM through connection 19, logic network LB, connection 2h, channel 5c and connection 4.

If the processor must also be informed of the occurred state transition in one or both points of the pair, a corresponding message is prepared in memory MM (in flow-chart step 110) with information on the kind of transition and on the point concerned.

Such a message is sent to register RS by unit ULA through connection 22, bus 10 and connection 32 and thence, through connection 2f, channel 5d and connection 4, into the area of common memory ME designed for receiving messages arriving from preprocessor PE.

The address of the cell or cells of this memory area available for the message of recognized transition and the actual writing order are transmitted in the manner described above. Such an address is read by unit ULA in one of its internal registers, where it has been elaborated by starting from the initial area address in memory ME (datum stored in memory ML) and by incrementing, in a step 111, such address by one unit every time a message is sent by preprocessor PE.

The preceding discussion (operations 108-111) applies to the case of points connected to sensors. If, on the other hand, the scanned pair is connected to drivers, as determined at decision junction 107', samples arriving from register RE are obviously meaningless and will all have always the same logical value. Moreover, in the word allotted to such pair in memory ME, bits which otherwise would denote the counting and the integration threshold will have a fixed configuration, different from any possible configuration of bits corresponding in words pertaining to the state of points connected to the sensors; furthermore, the bit representing the previous state for points connected to sensors will represent in this case the logical value of the sample to be emitted.

Owing to the fixed logical value of the arriving samples and to the particular configuration of the state word read in memory ME, there will now be addressed one of the cells of memory MIN containing the codes relating to the sample that is to be sent to assembly DR. As a consequence, connection 28 will carry information, designed for sequencer CM, to the effect that no further operations are to be carried out as far as the common memory ME is concerned and that bits present on connection 27 are to be transferred (step 112) to register RU through bus 10 and connection 33; from register RU the samples are then sent to assembly DR through connection 1b.

In case of asynchronous operation of the preprocessor, the code relating to the pair of points to be scanned is not supplied by assembly DR to register RE but is generated inside preprocessor PE by a counting in a cell of memory ML. Moreover, register RE receives—instead of the present-pair signal—the starting signal of the multiframe which initiates a number of processing cycles equal to the number of the pairs of samples constituting that multiframe. Thus, the duration of each cycle may vary but, of course, must not exceed the duration of the multiframe.

When the counting in the aforementioned cell of memory ML generates a certain pair code, the same is sent to register RU through connection 26, bus 10 and connection 33 and, upon instruction from circuit CT, is transmitted to assembly DR through connection 1b to command the transfer to preprocessor PE of the samples (real or fictitious) relating to this pair.

When these samples arrive, their integration is carried out (in the case of points connected to sensors) or operations associated with the transfer of samples to assembly DR are performed (in the case of points connected to drivers) in the same way as seen for the synchronous case, except that unit ULA will receive the various elements of the pair code from memory ML instead of from register RE.

(B) Clock messages

Once the operations 105–112 pertaining to the scanning of circuit points are terminated, the preprocessor carries out the task of next-lower priority, i.e. the emission (step 114) of possible clock messages for processor EL. The request for emission is temporarily stored in logic network LC which is monitored in a recurrent inquiry sequence 124, 124', 125 by component CM; the request is subsequently loaded in a transfer operation 118 into unit RP which for this purpose includes an internal clock whereon the desired emission periodicity may be set.

Unit RP communicates, at 113, the existence of such request to the sequencer CM which correspondingly positions the microprogram. Thereafter, the message is sent in the same way as described for messages of recognized transitions, as indicated in FIG. 3 at 114 and 115.

(C) Time counting

When the processor requires time countings to be carried out (e.g. for emitting a signal of a certain duration), it writes, in available cells of the tables provided for this purpose in memory ME, the codes corresponding to the requested counting durations. Such codes will consist for instance of an indication of a number of unitary counting steps which are to be carried out by preprocessor PE; the execution order for such steps will be communicated by processor EL in a rhythm equal to that provided for such a counting operation.

These orders are loaded in the aforedescribed way into network LC whence they are transferred to unit RP (step 118) through connection 12, circuit DM, connection 15, memory MM and connection 18. In unit RP the orders are stored with an indication of priority for their execution, this priority increasing with the rate of the various countings; they will then be carried out, during the various operating cycles of preprocessor PE, when the other tasks with higher priority have been accomplished.

When preprocessor PE is available for counting operations, it initiates an investigation 116 of unit RP; if a time-counting request is detected, the corresponding information is supplied to sequencer CM through connection 14 and generates a memory MM, as already seen, the order 117 of determining the address in memory ME of the cell corresponding to the fastest counting rate and the order 119 of reinscribing in the occupied cell the value of the counting code decreased every time by one unit: upon the reading of this cell, provided a ZERO counting code has not been attained therein (negative reply to an inquiry 121), preprocessor PE undertakes a scan 121' of unit RP to determine whether there are any lower-priority counting requests. A scan 121' with positive results induces preprocessor PE to ascertain in a step 120 the cell address associated with the next-highest counting rate and to decrement according to order 119 the cell contents at such address and so on to the end. It is, of course, assumed that the system capacity and the table length are such as to allow their complete reading during the time elapsing between two orders sent by processor EL.

The rules for reading and writing in memory ME are those already described.

The current address for these operations is elaborated and memorized in unit ULA, beginning with the initial address of the table as stored in memory ML in the start-up phase 103,103'.

Upon the attainment of a zero couting code in a cell, the corresponding order in unit RP is removed in an erasing operation 123 and will be reinscribed in the subsequent cycle. Whenever the counting code in a cell attains zero value, a message of elapsed time containing the address of the cell affected by such counting operation is sent to the common memory ME, as indicated in FIG. 3 at 122. That message is transferred in the same way as described above for the transfer of messages of recognized transitions.

After the writing and reading of the time-counting codes in the memory, the preprocessor gives up the bus control; information to this effect is sent by memory MM through connection 19, logic LB and connection 2g to processor EL.

In the foregoing description we have assumed the absence of any malfunctions which may be detected by preprocessor PE in the course of its operation.

Such malfunctions may be the addressing by sequencer CM of nonsignificant cells of memory MM, or the arrival at processor EL of faulty orders or order sequences.

In both cases there is addressed in memory MM a cell corresponding to the emission of an "interrupt" signal which is sent onto command channel 5c and thence to the processor.

The transfer of such a signal to channel 5c may take place through connection 19, logic LB and connections 2g or through a connection particularly provided for this purpose.

Other kinds of malfunctions may be detected by processor EWL through the normal checking procedures and communicated to preprocessor PE by means of an interrupt signal (steps 125, 126) and are of no relevancy to our present invention.

We claim:

1. In a telecommunication system wherein a multiplicity of circuit points are partly monitored by sensors and partly controlled by drivers, including a processor for handling incoming signals from said sensors and causing the emission of outgoing signals to said drivers, the combination therewith of:

a preprocessor with input connections from said sensors and output connections to said drivers;

a common memory available to said processor and to said preprocessor; and a bus interlinking said processor, said preprocessor and said common memory;

said preprocessor comprising a microprogrammer responsive to an instruction from said processor, communicated via said bus, for carrying out a sequence of operations involving a seizure of said bus by said preprocessor for the duration of said sequence, a scanning of consecutive circuit points on the basis of address information supplied by said common memory, reception of incoming signals and emission of outgoing signals relating to points being scanned, and an evaluation of said incoming signals, said preprocessor further comprising logical circuitry for performing said evaluation by an exchange of data with said common memory through said bus, said logical circuitry including a read-only memory jointly addressable by a current-state signal from a given circuit point and a previous-state signal from said common memory for supplying integration codes determining the recognition of a definite change of state to be communicated to said processor, said microprogrammer including a microprogram memory stepped by a sequencer and a logic network inserted between said microprogram memory and said sequencer for commanding the performance of lower-priority tasks after the scanning of said circuit points and prior to release of the bus by said preprocessor.

2. The combination defined in claim 1 wherein said logical circuitry further includes a working memory for storing an initial address received from said common memory at the beginning of said sequence, and arithmetic means controlled by said microprogrammer for modifying said initial address on the basis of signals identifying the scanned circuit points.

3. In a telecommunication system wherein a multiplicity of circuit points are partly monitored by sensors and partly controlled by drivers, including a processor for handling incoming signals from said sensors and causing the emission of outgoing signals to said drivers, the combination therewith of:

a preprocessor with input connections from said sensors and output connections to said drivers;

a common memory available to said processor and to said preprocessor; and a bus interlinking said processor, said preprocessor and said common memory;

said preprocessor comprising:

(a) a microprogrammer responsive to an instruction from said processor, communicated via said bus, for carrying out a sequence of operations involving a seizure of said bus by said preprocessor for the duration of said sequence, a scanning of consecutive circuit points on the basis of address information supplied by said common memory, reception of incoming signals and emission of outgoing signals relating to points being scanned, and an evaluation of said incoming signals, (b) logical circuitry for performing said evaluation by an exchange of data with said common memory through said bus, said logical circuitry including a read-only memory jointly addressable by a current-state signal from a given circuit point and a previous-state signal from said common memory for supplying integration codes determining the recognition of a definite change of state to be communicated to said processor, said logical circuitry further including a working memory for storing an initial address received from said common memory at the beginning of said sequence, and arithmetic means controlled by said microprogrammer for modifying said initial address on the basis of signals identifying the scanned circuit points, and (c) input and output registers for the temporary storage of incoming and outgoing signals, respectively, other registers for the temporary storage of data arriving from and leaving for said common memory via said bus, and a further register inserted between said arithmetic means and said bus for reading out modified addresses throughout the seizure of said bus by said preprocessor.

4. The combination defined in claim 3, wherein said microprogrammer includes a microprogram memory stepped by a sequencer and a logic network inserted between said microprogram memory and said sequencer for commanding the performance of lower-priority tasks after the scanning of said circuit points and prior to release of the bus by said preprocessor.

5. The combination defined in claim 3 wherein said read-only memory has cells containing sample codes for the generation of outgoing signals, said cells being jointly addressable by a predetermined incoming signal from driver-controlled circuit points and data bits stored in areas of said common memory respectively allocated to such circuit points.

* * * * *